(12) United States Patent
Callahan (10) Patent No.: US 6,256,037 B1
(45) Date of Patent: Jul. 3, 2001

(54) METHOD AND SYSTEM FOR SELECTING AT LEAST ONE OPTIMAL VIEW OF A THREE DIMENSIONAL IMAGE

(75) Inventor: Terrance Callahan, Aurora (CA)

(73) Assignee: Dicomit Dicom Information Technologies Corp., Markham (CA)

( * ) Notice: Subject to any disclaimer, the term of this patent is extended or adjusted under 35 U.S.C. 154(b) by 0 days.

(21) Appl. No.: 09/200,706

(22) Filed: Nov. 27, 1998

(51) Int. Cl.[7] .................................................. G06F 15/00
(52) U.S. Cl. ............................................................ 345/419
(58) Field of Search .................................. 345/419, 421, 345/425, 426, 427

(56) References Cited

U.S. PATENT DOCUMENTS 5,454,371   10/1995   Fenster et al. ................. 128/660.07
5,562,095   10/1996   Downey et al. ................ 128/660.07
5,949,424 * 9/1999   Cabral et al. ........................ 345/426

* cited by examiner

*Primary Examiner*—Phu K. Nguyen
(74) *Attorney, Agent, or Firm*—Ridout & Maybee (57) ABSTRACT

A method and system for selecting at least one optimal view of a computer-generated three dimensional image. The three dimensional image is generated by mapping image properties onto a coordinate space modeled by the computer. Then, selected coordinates of the coordinate space are projected onto a display to show a view of the three dimensional image. Points of interest can be selected and the view can be changed to include projections of different selected coordinates of the coordinate space. After at least two points have been selected, at least one optimal view is determined so as to include the selected points, and is projected onto the display.

13 Claims, 4 Drawing Sheets

FIG. 1

1. Start - goto 2

2. Initialize:
   Initialize model coordinates, window coordinates and ordered image data and mappings between each.
   Initialize modelPoly - clip state includes 6 faces and 8 vertices of a parallelepiped (modelPoly)
   R, S and T matrices are initialized such that there is no rotating, scaling or translating of winPoly relative to modelPoly
   Set of interesting coordinates is initially empty
   Goto 3

3. Apply R, S and T matrices to modelPoly to generate the winPoly
   Goto 4

4. One-to-one project the winPoly onto the x-y coordinates. Use the raster and data submodules to fill all visible surfaces with data corresponding to the integer points inside the surface
   Goto 5

5. Display the filled surface on the screen and select desired action:
   Rotate                    goto 6
   Scale                     goto 7
   Translate                 goto 8
   Slice                     goto 9
   Pivot                     goto 10
   Select a point of interest? goto 11
   Exit                      goto 15

6. Rotate winPoly by multiplying the rotation matrix R by a suitable transformation matrix
   Goto 3

7. Scale winPoly by multiplying the scaling matrix S by a suitable transformation matrix
   Goto 3

8. Translate winPoly by multiplying the translation matrix T by a suitable transformation matrix
   Goto 3

9. Translate a visible face along its normal (slicing)
   Goto 14 and modify clip state by adding face (and by subtracting starting surface if starting surface is not one of the initial 6 faces)

FIG. 2-1

10. Pivot a visible surface about any point on the surface (this is only an option if this surface is not one of the initial 6 faces)
    Goto 14 and modify clip state by adding new surface, and deleting starting surface 11. For the point selected, determine corresponding coordinates of interest and add these coordinates to the set of interesting coordinates. If there are at least two coordinates in the set of interesting coordinates then goto 12. Otherwise goto 5

12. Generate optimal surface. If yes then goto 13. If no, then goto 5

13. Determine optimal surface containing at least two coordinates of interest by executing the pseudo code steps of Figure 3. Then automatically perform actions of steps 6 to 10 as required to render optimal surface visible. Goto 14 to update clip state.

14. Modify modelPoly by cutting to reveal new surface. Add new surface to clip state. Goto 3

15. Exit

FIG. 2-2

C. PSEUDO CODE 1.  3 POINT PLANE GENERATION

VECTOR3  autoPts[3];

VECTOR3  temp1 = autoPts[1] - autoPts[0];   // first vector in the plane
VECTOR3  temp2 = autoPts[2] - autoPts[0];   // second vector in the plane VECTOR3  normal = temp1 * temp2   // take the cross product to get the normal ////////////////////////////////////////////////////////////////////////////////////////
// for a vector (x, y, z) and normal vector (A, B, C), the plane equation is:
// D = A * x + B * y + C * z float D = normal.x * autoPts[0].x + normal.y * autoPts[0].y + normal.z * autoPts[0].z;

Plane P = Plane(normal, D);

addPlaneToCube(P);

renderIntoBuffer();

2.  2 POINT PLANE GENERATION

VECTOR3  autoPts[3];
VECTOR3  temp1 = autoPts[1] - autoPts[0];   // first vector in the plane calcNormalFromAxis(temp1);              // calculate normal with y component equal
to zero ////////////////////////////////////////////////////////////////////////////////////////
// for a vector (x, y, z) and normal vector (A, B, C), the plane equation is:
// D = A * x + B * y + C * z float D = normal.x * autoPts[0].x + normal.z * autoPts[0].z;
Plant P = Plane(normal, D);

addPlaneToCube(P);
renderIntoBuffer();

FIG. 3

METHOD AND SYSTEM FOR SELECTING AT LEAST ONE OPTIMAL VIEW OF A THREE DIMENSIONAL IMAGE

FIELD OF THE INVENTION

The present invention relates generally to the analysis of computer-generated images, and more particularly to a method and system for selecting at least one optimal view of a three dimensional image.

BACKGROUND OF THE INVENTION

Computer-generated images are used in many different industries to model surfaces and solids. In the medical fields, computer imaging is used in combination with ultrasound imaging, magnetic resonance imaging or other medical imaging technology to display, analyze and organize the data these medical imaging technologies provide. For example, ultrasound machines use ultrasonic wave, i.e. sonar, to scan a patient's body. The data thus obtained is then analyzed by physicians to assist the physicians in their diagnosis and treatment of patients. Ultrasound can be used to view a fetus, blood-flow patterns in arteries, or to scan organs for irregularities such as cysts, etc.

Typically, a three dimensional image is displayed to a user by being projected on a two dimensional surface such as a screen or a print out. Computer systems have been device that permit the user to take different cross-sectional views of the image, thereby enabling a user to view a portion of the three dimensional image by choosing one or more cross-sectional views. Some computer systems permit the user to geometrically transform the image by rotating, translating and scaling the image, and also permit the user to take cross-sectional views at different orientations, such that the user can sequentially view the three-dimensional image using a series of oblique planes. Other computer systems take a different approach; instead of showing a cross-section of the three dimensional image, they "render" the image by making part of the image transparent or translucent such that points under those parts are revealed. In a maximum intensity display, for example, the highest intensity points along a line parallel to the line of sight of the user are shown, similar to an x-ray picture of a foot.

While three dimensional images provide a wealth of information, filtering out the information that is of interest from irrelevant information can be very time-consuming. There may be many different cross-sectional views of interest in a single three dimensional image. Each of these different cross-sectional views may contain only one point of interest. If all of these cross-sectional views must be stored and subsequently reviewed, then resources may be wasted in that a great deal of irrelevant information is being stored and must be filtered out again when the cross-sectional views are again reviewed. It may also be necessary to keep track of many different cross-sectional views of the three dimensional image in order to keep track of all of the points of interest in that three dimensional image.

Accordingly, there is a need for a system and method of analyzing computer-generated images in order to filter out as much irrelevant information as possible from the cross-sectional views used to display the information of interest.

BRIEF SUMMARY OF THE INVENTION

An object of one aspect of the present invention is to provide a method of analyzing a computer-generated three dimensional image and of selecting at least one view of the three dimensional image that maximizes the relevant information as compared to alternative views of the three dimensional image.

According to one aspect of the present invention there is provided a method of selecting at least one optimal surface of a three dimensional image such that the at least one optimal surface includes at least two spatial coordinates of interest. The three dimensional image is generated in a coordinate space by an image-defining array consisting of ordered image properties. Each order image property in the image-defining array has a unique spatial coordinate in the coordinate space such that each ordered image property is mappable to the unique associated spatial coordinate.

The three dimensional image also has a plurality of surfaces. Each surface has an associated image-defining subarray in the image-defining array such that each surface of the plurality of surfaces is generated by mapping each ordered image property of the associated image-defining subarray onto the unique associated spatial coordinate. Thus plurality of surfaces includes a selected visible surface shown in a display divided up into a plurality of display coordinates. The display selectably displays views such that a series of distinct selected visible surfaces of the plurality of surfaces of the three dimensional image are viewable on the display. The display includes an associated one-to-one projection means for projecting each selected visible surface of the three dimensional image onto the display, such that a view-specific one-to-one correspondence exists between each display coordinate and the spatial coordinate projected.

The method is implemented using a data processor having a memory, a coordinate space modeling means, a user interface means, a mapping means. The memory has access to the image-defining array. The coordinate space modeling means is located in memory and models and manipulates the coordinate space. The coordinate space modeling means responds to a group of commands to rotate the coordinate space, translate a selected visible surface of the coordinate space, and, pivot a selected visible surface about an arbitrary axis on the selected visible surface. The user interface means permits commands to be selected from the group of commands, and communicates with the coordinate space modeling means in order to relay selected commands to the coordinate space modeling means.

The mapping means is operable for each visible surface of the three dimensional image to map each ordered property of the associated image-defining subarray for each visible surface onto the unique associated spatial coordinate in the coordinate space to generate the visible surface of the three dimensional image.

The method comprises the following steps. (1) The user interacts with the coordinate space via the user interface means and the coordinate space modeling means to generate a series of views of the three dimensional image in the display. Each view includes at least one selected visible surface of the three dimensional image. (2) The user then select a plurality of spatial coordinates of interest from the series of views. Each spatial coordinate of interest in the plurality of spatial coordinates of interest is selected by selecting a display coordinate in an associated view in the series of views using the user interface means. The spatial corrdinate of interest is then determined based on the associated view and the view-specific one-to-one correspondence between the selected display coordinate and the spatial coordinate of interest mapped on the selected display coordinate. (3) Next, the coordinate space is manipulated by the coordinate space modeling means to orient a selected visible surface of the coordinate space, such that the selected visible surface of the coordinate space corresponds to the at least one optimal surface.

In preferred versions of the above-described method, step 3 is executed automatically on user command after selection of at least two or three coordinates of interest.

In another preferred version of the above-described method, when at least three coordinates of interest are selected, step 3 includes the following steps. (1) Calculating a first vector by subtracting a first coordinate of interest selected from the at least three coordinates of interest from a second coordinate of interest selected from the at least three coordinates of interest. (2) Calculating a second vector by subtracting the first coordinate of interest from a third coordinate of interest selected from the at least three coordinates of interest. (3) Automatically applying the group of commands to (i) rotate the coordinate space; (ii) translate a selected visible surface of the coordinate space; and, (iii) pivot a selected visible surface about an arbitrary spatial coordinate on the selected visible surface such that an optimal defined by the first vector, the second vector and any one of the at least three corrdinates of interest is a visible surface.

In accordance with another aspect of the present invention there is provided a method of selecting at least one optimal view from a plurality of views of a three dimensional image. The plurality of views is generated from an image-defining array using a data processor having a coordinate space modeling means for modeling and manipulating a coordinate space. The data processor also includes a display for showing the plurality of views of the coordinate space.

The image-defining array has a plurality of ordered image properties. Each ordered image property in the plurality of ordered image properties has a unique associated coordinate in the coordinate space such that the three dimensional image is generated in the coordinate space by mapping each ordered image property in the plurality of ordered image properties onto the unique associated coordinate in the coordinate space. Each view in the plurality of views has an associated view-defining subarray in the image-defining array, such that each view in the plurality of views is shown on the display by being generated in the coordinate space by mapping each ordered image priority in the associated view-defining subarray onto the associated corrdinate in the coordinate space and by being projected from the coordinated space onto the display.

The method includes the following steps:
(1) selecting a plurality of coordinates of interest in the coordinate space;
(2) determining the at least one optimal view in order to contain the plurality of coordinates in a minimum number of views;
(3) showing the at least one optimal view on the display.

In accordance with an embodiment of the present invention, there is provided a system for selecting at least one optimal surface of a three dimensional image such that the at least one optimal surface includes at least two spatial coordinates of interest. The three dimensional image is generated in a coordinate space by an image-defining array having a plurality of ordered image properties, each ordered image property in the image-defining array having a unique associated spatial coordinate in the coordinate space such that each ordered image property is mappable to the unique associated spatial coordinate. The three dimensional image has a plurality of surfaces, each surface of the plurality of surfaces having an associated image-defining subarray in the image-defining array such that each surface of the plurality of surfaces is generated by mapping each ordered image property of the associated image-defining subarray onto the unique associated spatial coordinate. The plurality of surfaces includes a selected visible surface shown in a display.

The display is divided up into a plurality of display coordinates, and selectably displays views such that a series of distinct selected visible surfaces of the plurality of surfaces of the three dimensional image are viewable thereon the display has an associated one-to-one projection means for projecting each selected visible surface of the three dimensional image onto the display, such that a view-specific one-to-one correspondence exists between each display coordinate and the spatial coordinate projected thereon.

The three dimensional image is generated using a data processor having a memory, a coordinate space modeling means, a user interface means, a mapping means. The memory has access to the image-defining array. The coordinate space modeling means is loaded in memory and models and manipulates the coordinate space. The coordinate space modeling means responds to a group of commands to rotate the coordinate space, translate a selected visible surface of the coordinate space, and, pivot a selected visible surface about an arbitrary axis on the selected visible surface. The user interface means permits commands to be selected from the group of commands, and communications with the coordinate space modeling means in order to relay selected commands to the coordinate space modeling means.

The mapping means is operable for each visible surface of the three dimensional image to map each ordered image property of the associated image-defining subarray for each visible surface onto the unique associated spatial coordinate in the coordinate space to generate the visible surface of the three dimensional image.

The system includes coordinate selection means operable to select a plurality of spatial coordinates of interest from a series of views generated using user interface means and the coordinate space modeling means, each view including at least one selected visible surface of the three dimensional image. Each spatial coordinate of interest in the plurality of spatial coordinates of interest is selected by selecting a display coordinate in an associated view in the series of views using the user interface means, and by determining the spatial coordinate of interest based on the associated view and the view-specific one-to-one correspondence between the selected display coordinate and the spatial coordinate of interest mapped thereon. The system also includes an optimal surface generation means operable to manipulate the coordinate space via the coordinate space modeling means to orient a selected visible surface of the coordinate space, such that the selected visible surface of the coordinate space corresponds to the at least one optimal surface.

In accordance with another embodiment of the present invention there is provided a system for viewing at least one coordinate of interest in a three dimensional image generated on a data processor having a coordinate space modeling means for modeling and manipulating a coordinate space and a display for simultaneously showing at least three views of the three dimensional image. The system includes point selection means for selecting an arbitrary coordinate of interest from a first view in the plurality of views, and also includes orthogonal view generation means for generating two mutually orthogonal views on the display. Both of the two mutually orthogonal views on the display are orthogonal to the first view and intersect with the first view at the arbitrary coordinate of interest such that the arbitrary coordinate of interest can be viewed from three orthogonal directions simultaneously.

BRIEF DESCRIPTION OF THE DRAWINGS

Reference will now be made, by way of example, to the accompanying drawings, which show preferred aspects of the present invention, and in which

FIG. 2 is a pseudo code listing of the logic steps to be executed in an optimal view selection method according to the present invention; and, FIG. 3 is a pseudo code listing of the logic steps required to determine an optimal plane in accordance with step 13 of FIG. 2.

DETAILED DESCRIPTION OF THE PREFERRED EMBODIMENTS OF THE INVENTION

Figure 1:
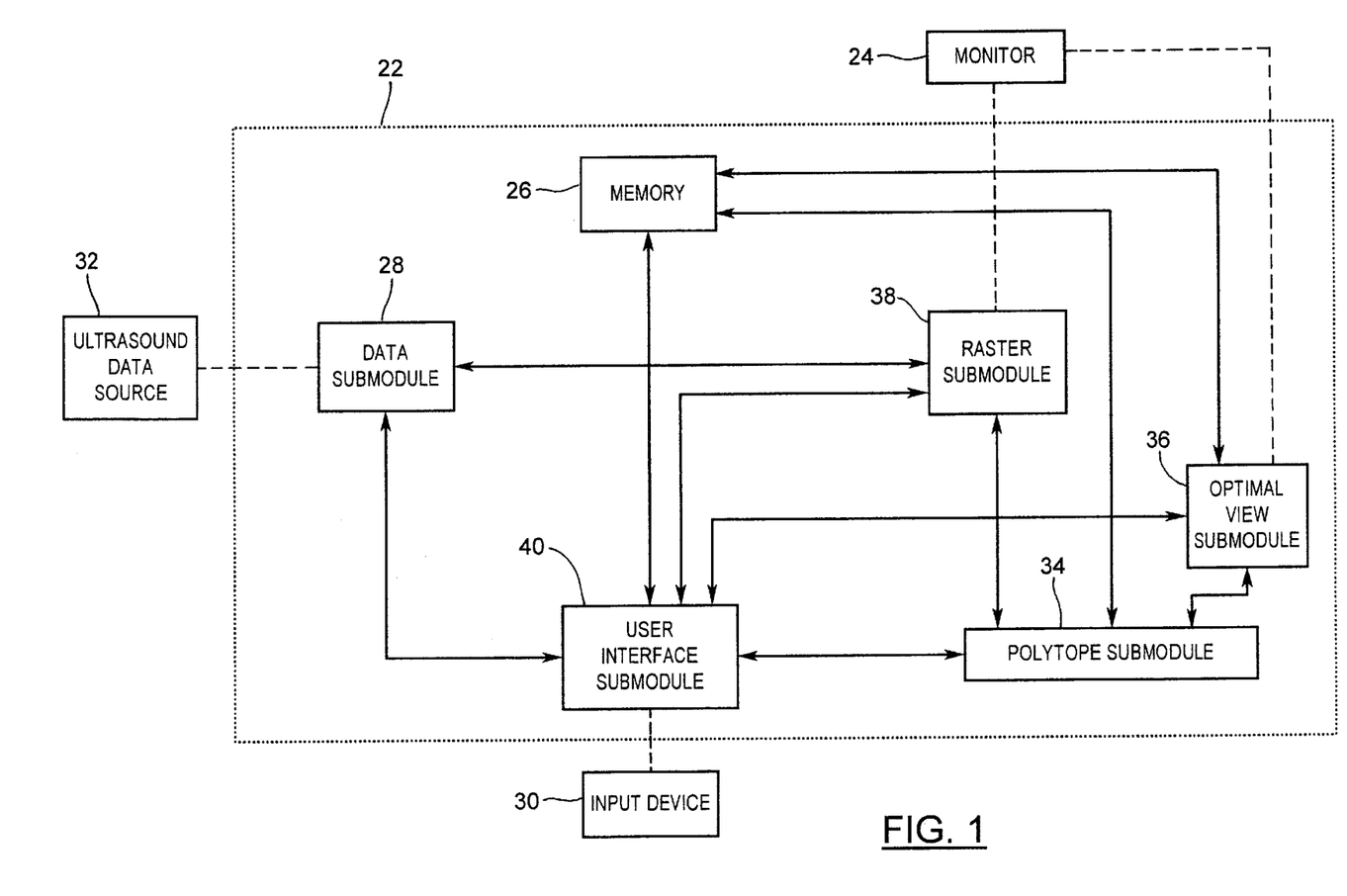
FIG. 1 is a block diagram showing an optimal view selection system according to the present invention.

Referring to FIG. 1 there is illustrated a block diagram of a computer system 22 for analyzing computer-generated three dimensional images in accordance with a preferred embodiment of the invention. As shown in FIG. 1, the computer 22 is connected to a monitor 24 having a 640 by 480 screen, an input device 30 such as a manually operated mouse 30, and an ultrasound image data source 32 such as an ultrasound archive system that stores retrievable ultrasound image data.

When scanning a patient, an ultrasound operator passes a probe over a portion of the patient's body. The probe emits and receives a series of ultrasonic waves. Based on the difference between the ultrasonic waves that are emitted and those that are received, a frame of data representing a cross-sectional view of the patient's body is obtained along the path of the probe. The probe generates, say, 150 frames of data in a typical pass over the scanned portion of the patient's body. Each frame of data represent a cross-section of the part of the patient's body that is scanned using ultrasonic waves. Each frame is typically 640 by 480 pixels, but only the region of interest, which is typically about 250 by 250 pixels, is stored. Accordingly, the image data in the ultrasound image data source 32 for a single image would consist of 150 frames, each frame being about 250 by 250 pixels.

The image data source 32 communicates with the computer 22 and provides image data to a data submodule 28 of the imaging software (not represented in the bock diagram of FIG. 1) on the computer 22. The data submodule 28 orders the image data in an image data array, such that each ordered property in the image data array has associated spatial coordinates. The x and y spatial coordinates are determined by the location of the data within the 250 by 250 frame, while the z spatial coordinate is assigned to the data by the data submodule 28 based on the frame in which the data is found.

In order to form three dimensional images based on the ultrasound data for image data received from the ultrasound image data source 32, the computer 22 includes a conventional polytope submodule 34 for generating a coordinate space. Preferably, the coordinate space takes the form of a right-angled parallelepiped, which will be referred to as modelPoly (where "poly" is an abbreviation of "polyhedron"). The modelPoly is defined around the origin of a left-handed xyx coordinate system.

The polytope submodule 24 handles all of the geometry involved in rotating, translating and scaling modelPoly. The calculations involved in geometrically transforming the coordinate space are more easily performed when modelPoly remains located about the origin. Accordingly, all of the geometry involved in rotating, translating and scaling modelPoly is recorded in a rotation matrix R a translation matrix T and a scaling matrix S, while modelPoly itself remains located about the origin. ModelPoly is rotated, translated and scaled by the matrices R, T and S to form a winPoly. It is winPoly as projected on the screen of the monitor 24 that the user sees. Initially, the matrices R, T, and S do not specify any rotation, translation or scaling of winPoly as compared to modelPoly. Then the user gradually adds information to each of R, T and S by performing sequences of geometrical transformations on winPoly. Say, for example, that the user rotates winPoly, thereby changing the visible face of winPoly (by convention, visible faces are defined by a line of sight that is parallel to the z coordinate axis and is negative). This rotation information is recorded in R by multiplying $R_c$ by a matrix representing the rotation of winPoly ($R$, in this case—R is the rotation matrix after n distinct rotations have been applied to modelPoly) Subsequently, winPoly is rotated again; this information is recorded in $R_2$ by multiplying $R_1$ by a matrix representing this second rotation of winPoly (the matrix generated by $R_1^{-1}*R_2$ in this case).

Some operations such as slicing and pivoting are recorded on modelPoly itself and not in the matrices that transform modelPoly to winPoly. These operations determine the clip state of modelPoly, that is, these operations determine all of current surfaces of modelPoly. Initially, this clip state includes the six faces and eight vertices of the parallelelepiped. A new surface can then be added by slicing in from one of the original six planes along the normal of such original face to generate a new surface parallel to such original face. Then this first-added surface can be discarded by cutting in from the first-added surface, or by pivoting about an arbitrary axis on the first-added surface to generate a second-added surface. After this second operation, the clip state would include the six initial faces and the second-added surface, but not the first-added surface, which has been discarded.

After modelPoly is rotated, translated and scaled by the matrices R, T and S to form winPoly, the coordinates of the visible faces of winPoly are projected to a two-dimensional image with lines connecting adjacent coordinates. The two-dimensional projection of winPoly is then sent to a raster submodule 38 (FIG. 1). The raster submodule 38 maps image data onto the two-dimensional image of each visible faces of winPoly, by, for each ordered image property of the image data array that has associated coordinates on a visible surface, mapping such ordered image property onto such associated coordinates. First, the projected face is broken up into contiguous, 2 dimensional triangles. Next, each triangle is filled by first identifying the minimum y value and the maximum y value that lie in the triangle. The, for these two points, and for each y value falling between these two points, a line segment is determined. One end of this one segment is a point having the smallest x integer value falling inside the triangle, while the other end is a point having the largest x integer falling inside the triangle. The ordered image properties having associated spatial coordinates corresponding to this line segment are then mapped onto the line segment by the raster submodule.

The projected two dimensional image of winPoly is projected onto the screen of the monitor 24 where it can be seen by the user. Using the input decvice 30, the user can send commands to a user interface submodule 40, where these commands are interpreted and transmitted to the polytope module 34. These commands include translate, rotate or scale, winPoly, in which case the polytope submodule 34 updates the matrices T, R and S as required. Alternatively, these commands include slice or pivot surfaces of modelPoly, in order to add new surfaces to modelPoly. These new surfaces of modelPoly will also appear in winPoly, after being rotated, translated and scaled by R, T and S, and from winPoly will be projected onto a two dimensional surface to be displayed on the monitor 24.

The above-described geometrical manipulation as well as surface generation using slicing and pivoting are well known to those skilled in the art of medical imaging and are widely used. Accordingly, no further detail regarding these imaging techniques will be provided herein. Using the above-described computer system, users can generate a series of sectional views, which may be parallel to one of the originally six faces or may be obliquely section views. These selected views can then be reviewed by a physician or other suitably skilled person to identify points of interest. Those sectional views that include points of interest will typically be retained by the physician, who will use them to help make a diagnosis.

When reviewing image data using the computer 22, a user interacts with winPoly as displayed on the monitor 24, by translating, rotating and scaling winPoly, ad by slicing or pivoting surfaces of modelPoly, which sliced and pivoted surfaces are automatically mapped onto winPoly. When the user finds a point of interest in a particular viewed surface, the user presses an "Optimal Surface" button and using the input device 30 selects the point of interest, thereby specifying the display coordinates of the point of interest on the monitor 24. This sends a message to an optimal view submodule 36 via input device 30 and user interface submodule 40 that a point of interest is at the display coordinates specified. The optimal view submodule 36 then determines the spatial coordinates on the visible surface of winPoly that corresponds to the display coordinates of the point of interest on the monitor 24 as well as the corresponding modelPoly spatial coordinates, which are determined using the matrices R, T and S. These spatial coordinates of interest are then stored in memory 26. The user can then continue to interact with winPoly and to select new points of interest.

After two or more points of interest have been selected, and their corresponding modelPoly spatial coordinates have been stored, the user can elect to generate an optimal surface including at least two spatial coordinates of interest. If only two points are selected, then an optimal plane can be generated including both these points. The optimal plane is definable by either on of the two selected points, and by two vectors, one of which is the vector obtained by subtracting modelPoly spatial coordinates corresponding to one of the selected points from modelPoly spatial coordinates corresponding to the other of the selected points. The second vector used to define the plane can then be selected arbitrarily, provided, of course, that the second vector is not parallel to the first vector. For simplicity, the optimal view submodule sets the second vector equal to (O, Y, O), Y>0. The normal to the optimal plane thus generated is calculated by taking the cross product of the two vectors. This normal will lie in the xz plane.

Figure 3:
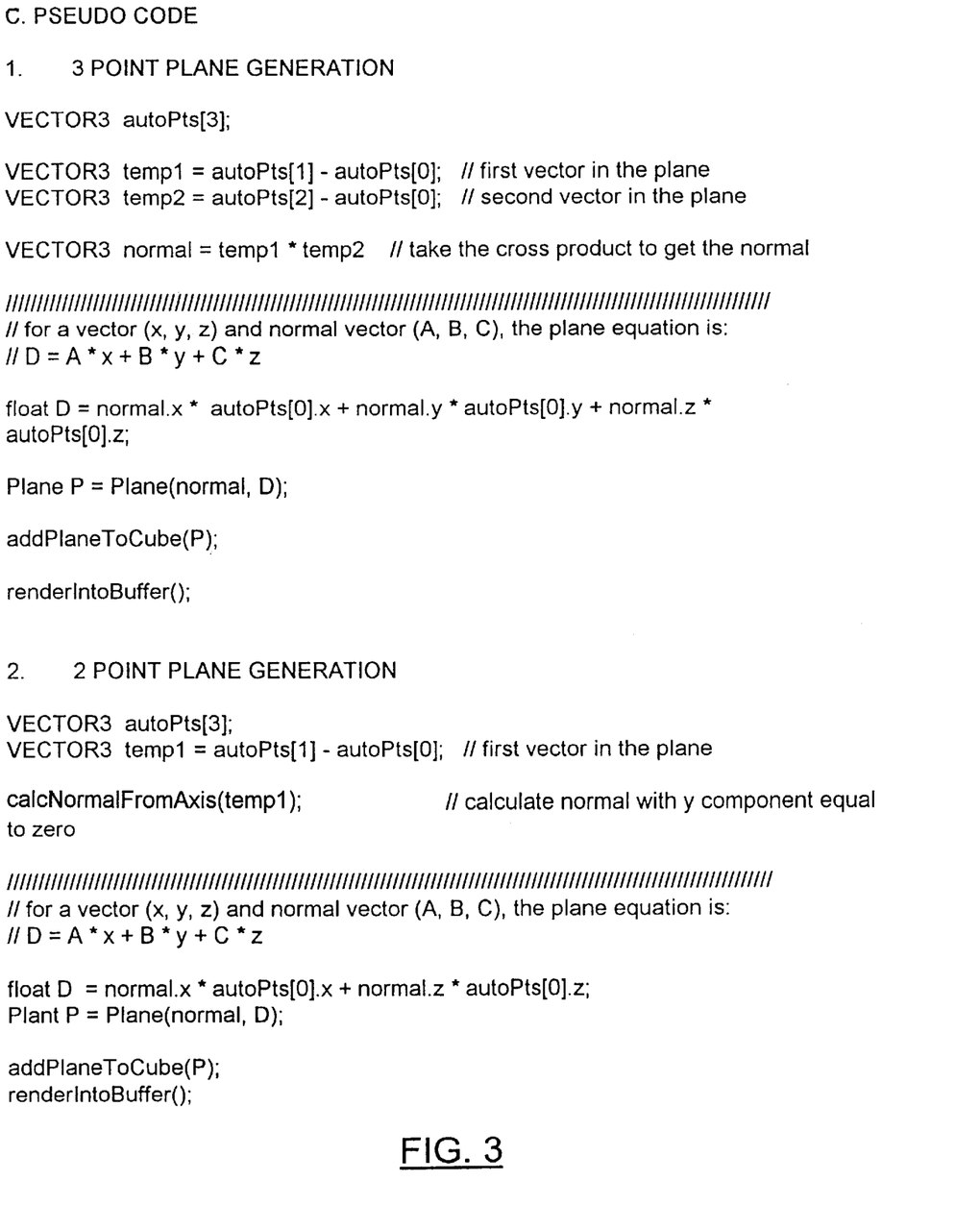

If three or more points of interest have been selected and their corresponding modelPoly spatial coordinates have been stored, the user can elect to generate an optimal surface including at least three spatial coordinates of interest. If only three point are selected, then an optimal plane is generated including these three points. The optimal plane is definable by any one of the three modelPoly spatial coordinates correspond to the three selected points, and by two vectors. These two vectors are defined by the three modelPoly spatial coordinates corresponding to the selected three points. Specifically, a first vector is determined by subtracting a first one of the three modelPoly spatial coordinates from a second one of the three modelPoly spatial coordinates, while a second vector is determined by subtracting the first one of the three modelPoly spatial coordinates from a third one of the three modelPoly spatial coordinates. The normal of the plane defined by these two vectors and any one of the modelPoly spatial coordinates corresponding to the three selected points is determined by taking the cross-product of these two vectors. FIG. 3 sets out in pseudo code the above-described steps of generating an optimal plane.

Once an optimal viewing plane has been defined, such plane is displayed on the monitor 24 by first rotating winPoly such that the optimal viewing plane will be visible when exposed (assuming that the above-stated convention holds, that the user's line of sight is parallel to the z axis and in a negative direction, then the rotation should result in the vector defining the normal of the optimal viewing plane having a positive z compoent, preferably, the z component should also be large relative the toe x and y components of the vector). Then a visible surface is sliced and pivoted as required to obtain the optimal viewing plane. The optimal view submodule 36 is integrated into the polytope submodule 34 and automatically performs these transformations to generate the optimal viewing plane as a visible face.

If more than three points of interest are selected then multiple optimal planes may be generated according to the above-described steps, and winPoly sequentially transformed to show each of these optimal planes as a visible face in turn. Alternatively, more complicated viewing surfaces may be generated that encompass more than three coordinates. A plane in an xyz coordinate system is defined by an equation of the form $Ax-By+Cz=D$. However, where four or more points are selected, and these four or more points cannot all contained in a single plane—which will usually be the case—then a suitable surface may be defined by a higher order equation or interpolating polynomial. This interpolating polynomial isbe determined using conventional interpolation techniques. In such cases, however, technique in addition to those described above would be required to render the surface as a visible surface. Further, as the normal to the surface varies over the surface, it would also be necessary to select a viewing orientation that permits all of the coordinates of interest to be viewed. For very complicated surfaces this may not be possible, and such surfaces would then be rejected as optimal viewing surfaces. It is likely, in any case, that the surfaces should be kept fairly simply in order to be easily interpreted by the user.

Preferably, the optimal view submodule 36 is integrated with the polytope submodule 34 such that on the user electing to display an optimal surface, these submodules automatically determine the plane that will contain the selected coordinates of interest and then manipulate modelPoly and winPoly to render such plane visible. Alternatively, however, the user can suitable manipulate modelPoly and winPoly manually to render visible a plane containing multiple points of interest without calculating the vectors defined the plane.

The optimal view submodule 36 enables a user to select a point of interest by freezing such point. As a consequence of so doing, the user will then be restricted to manipulating winPoly and modelPoly such that all visible surfaces displayed must include such point. This is possible as the polytope submodule 34 permits arbitrary pivoting about an arbitrary point, and not just about an arbitrary axis, on the visible surface. When the user, having frozen one point of interest already, finds a second point, then an optimal plane has been rendered visible. The user can then elect to freeze the second point as well. At that point, the user will still be able to generate new planes as the two frozen points of interest will together define an axis of rotation about which new planes can be chosen. If and when a third point of interest is located and frozen, the plane will be fixed, unless the third point falls on the axis of rotation defined by the first and second points.

In FIG. 2, a pseudo code listing shows the steps of a method of selecting at least one optimal view of a three dimensional image in accordance with a preferred aspect of the invention. The method is preferably implemented using the above-described three dimensional imaging system.

The first step of the method, after starting, is to initialize all of the data structures employed as indicated in line 2. The modelPoly, generated in model coordinates, is transformed by the rotation matrix R, the scaling matrix S and the translation matrix T to generate winPoly in window coordinates. All of these matrices are initialized so as to not rotate, scale or translate modelPoly when generating win-Poly (i.e. S specified 1:1 mapping such that there is no scaling). The ordered image properties of the image-defining array is mappable onto winPoly to generate projected visible surfaces of winPoly on the monitor 24 (although winPoly has not yet been generated). When viewing these projected visible surfaces of modelPoly, a user may decide to select a point of interest; the coordinate corresponding to this point of interest is then added to the set of interesting coordinates. Initially, however, the set of intersecting coordinates is empty.

ModelPoly has a clip state consisting of the six initial faces and the eight initially vertices of modelPoly's initially parallelepiped form, these six initial faces always remain in the clip state. New surfaces are added to the clip state when parts of modelPoly are cut away to expose these new surfaces; formerly new surfaces may be removed from the clip state at this point if such former new surfaces are part of the portion of modelPoly that must be cut away to expose the new surface.

Next, in line 3, the R, S and T matrices multiple each modelPoly coordinate to generate winPoly coordinates. Initially, there is no rotating, scaling or translation of modelPoly to generate winPoly. However, each time one or more of R, S and T are changed in subsequent steps, each coordinate in modelPoly is multiplied by the relevant matrix to change winPoly). These transformation techniques are well known to those skilled in the art. After step 3 has been executed, the next step, line 4, is to project winPoly into the x–y coordinates. This projection must be a one-to-one projection. After projecting winPoly onto the x–y coordinates, the raster and data submodules full all the visible surfaces by mapping the ordered image property specified by the image-defining array for each coordinate on the visible surface; "visible surfaces" are surfaces of winPoly that have been projected into the x–y coordinates.

After winPoly has been projected on the x–y coordinates, this projection is displayed on a screen. Then the user can choose from a number of options, including an exit option, by suitably manipulating the mouse. The use can rotate winPoly, which is mathematically represented by multiplying the current matrix $R_n$ ($R_n$ is the rotation matrix after n rotation operations) by a rotation transformation matrix $R_n$ to yield $R_{n+1}$ $R_{1+1}$ is then multiplied to each coordinate of modelPoly to yield each new coordinate of winPoly after the rotation represented by $R_c$. This sequence of steps is represented in FIG. 2 by the following loop: step 5 to step 6 to step 3 to step 4 to step 5. Analogous loops are defined by the pseudo code of FIG. 2 for scaling (step 5 to step 7 to step 3 to step 4 to step 5) and for translation (step 5 to step 8 to step 3 to step 4 to step 5).

The slicing and pivoting options of step 5 are different from the rotation, scaling and translation options of step 5 in that these modify modelPoly itself and its clip state, instead of merely modifying the matrices R, S and T used to generate winPoly from modelPoly. Before any slicing or cutting is performed, it will be one to three of the initial six faces of winPoly that are projected to the x–y plane, rasterized (image data is mapped to the visible surfaces by the raster submodule) and displayed,. These original faces are then pivoted or sliced by cutting away part of the modelPoly to expose a new surface. If a new surface is modified by slicing or pivoting, then the formerly new surface is deleted from the clip state and the current new surface is added. If, however, one of the initial 6 surfaces is cut away by slicing or pivoting, then such initial surface remains in the clip state. After slicing or pivoting, the clip state and modelPoly are suitably modified, as set out in step 14, and then the matrices R, S and T transform the modelPoly to yield a winPoly with new surfaces exposed. This new winPoly is then projected, one-to-one, onto the x–y plane, and is displayed on a screen. The slicing loop shown in FIG. 2 is step 5 to step 9 to step 13 to step 3 to step 4 to step 5 and the pivoting loop is step 5 to step 10 to step 13 to step 3 to step 4 to step 5.

If the user opts to select a point of interest, then the user locates the cursor as close to such point as possible and clicks an "Optimal Surface" button. The screen coordinate, (x–y coordinate) closest to such point is then determined. As there is a one-to-one correspondence between such x–y coordinate and the winPoly coordinates, the corresponding winPoly coordinates can be located. Then by multiplying such coordinates by the product of $R^{-1}$, $S^{-1}$ and $T^{-1}$, the corresponding modelPoly coordinates can be determined. These modelPoly coordinates are then designated coordinates of interest and are stored in memory. If there is only one coordinate of interest, then the user returns to step 5; thus, the loop in that case is step 5 to step 11 to step 5.

If two or more coordinates of interest have been determined, then the suer may elect at that time to generate an optimal plane. Assuming the user so elects, the rotation matrix R is modified so as to point the normal of the optimal plane in winPoly in a direction substantially parallel to the z axis, and having a positive sense. Then the surfaces of modelPoly are sliced and pivoted, and the clip state changed, as required, to expose the optimal surface. The loop specified by FIG. 2 is as follows: step 5 to step 11 to step 12 to step 13 to step 14 to step 4. Step 13 automatically goes to step 5 and executes the rotating, slicing and pivoting loops as required to tender the optimal plane visible. FIG. 3 sets out pseudo code for calculating an optimal plane.

Wile the subject invention has been described such that the coordinates of interest are selected form displayed surfaces of the three dimensional image, it will be appreciated by those skilled in the art that the surfaces need not be viewed in order to select coordinates of interest. For example, selection of the points of interest may be automated, such that no views of the three dimensional image are projected before the optimal view is generated. In the case of the scan of a liver, for example, the image would, in the case of a healthy liver, be expected to be fairly uniform, reflecting the relative homogeneity of the liver, In such case, the selection of coordinates associated with image properties that do not reflect this uniformity might well be automated.

Alternatively, coordinates may be selected from views that that are not views of surfaces. For example, the raster submodule 38 may perform a rendering mapping that shows the interior of winPoly. One example of a volume rendering mapping is to show winPoly as a series of rays parallel to the z coordinate axis. Then, all of the ordered image properties having associated coordinates on one such ray, only the ordered image property of highest intensity is mapped to such ray. Thus, the resulting image shows coordinates at varying depths, and indicates these depths by the distance of such coordinates along its ray.

A still further aspect of the present invention involves generating optimal views of a visible point of interest. Consider a selected face on modelPoly. Consider an arbitrary point on this face. Then, two planes can be generated that are perpendicular (orthogonal) to the selected plane, and that are also orthogonal to each other. Each plane correspond to a face (ortho-Face) inside the cube, generated by clipping the original 6-sided modelPoly against the new plane. There are in fact an infinite number of such pairs of orthofaces, so a convention is chosen where the first orthoFace has normal with component equal to zero.

The user now has three faces: the selected face and the two orthoFaces. There is a symmetry about these 3 faces: each face is cut by the other two orthoFaces at right angles. Now, the intersection of two faces determines a line segment, so for a particular face, there are two lines segments where each of the other two orthoFaces intersect with it. When these line segments are displayed, they resemble cross-hairs.

The selected face and its two orthoFaces are displayed separately, as if the user were viewing them face-on. Also, the user can see the selected face on the original cube, if it is visible. When cross-hairs are turned on, cross-hairs appear on the three separately displayed face views, and also on the original winPoly.

The user can shift the intersection point in any of the 4 displayed cross-hair faces, and see the corresponding two updated orthoFaces displayed in their respective areas on the screen. The user can also select one of the faces and rotate the two corrosponding orthoFaces about the axis of intersection.

After an optimal viewing plane is generated from 3 user-selected points of interest, the cross-hair point of intersection can be chosen as one of the user-selected points, and the two orthoFaces can be generated and displayed. The user can then turn the cross-hairs on and interrogate the region around the selected point by rotating the corresponding orthoFaces.

Accordingly, it will be apparent that the present invention may be implemented in other specific forms without departing from the spirit or the essential characteristics thereof. In particular, while the invention has been described in the context of medial imaging generally, and ultrasound imaging in particular, it will be apparent to those skilled in the art that the invention imaging contexts. The presently discussed embodiments are considered to be illustrative and not restrictive, the scope of the invention being indicated by the appended claims rather than the foregoing descriptions, and all changes that come within the meaning and range of the claims are therefore intended to be embraced.

What is claimed is:

1. A method of selecting at least one optimal surface of a three dimensional image, the three dimensional image being generated in a corrdinate space by an image-defining array having a plurality of ordered image properties, each ordered image property in the image-defining array having a unique associated spatial coordinate in the coordinate space such that each ordered image property is mappable to the unique associated spatial coordinate, having a plurality of surfaces, each surface of the plurality of surfaces having an associated image-defining subarray in the image-defining array such that each surface of the plurality of surfaces is generated by mapping each ordered image property of the associated image-defining subarray onto the unique associated spatial coordinate, and having a selected visible surface shown in a display, the selected visible surface being one of the plurality of surfaces of the three dimensional image;

the display having a plurality of display coordinates, selectably displaying views such that a series of distinct selected visible surfaces of the plurality of surfaces of the three dimensional image are viewable thereon, and having an associated one-to-one projection means for projecting each selected visible surface of the three dimensional image onto the display, such that a view-specific one-to-one correspondence exists between each display coordinate and the spatial coordinate projected thereon;

the method being implemented using a data processor having a memory, the memory having access to the image-defining array;

a coordinate space modeling means loaded in memory for modeling and manipulating the coordinate space, the coordinate space modeling means being responsive to a group of commands to (1) rotate the coordinate space;

(2) translate a selected visible surface of the coordinate space; and, (3) pivot a selected visible surface about an arbitrary axis on the selected visible surface;

a user interface means for selecting commands from the group of commands, the user interface means communicating with the coordinate space modeling means to relay selected commands to the coordinate space modeling means; and mapping means operable for each visible surface of the three dimensional image to map each ordered image property of the associated image-defining subarray for each visible surface onto the unique associated spatial coordinate in the coordinate space to generate the visible surface of the three dimensional image;

such that the at least one optimal surface includes at least two spatial coordinates of interest;

the method comprising:

(a) interacting with the coordinater space via the interface means and the coordinate space modeling means to generate a series of views of the three dimensional image in the display, each view including at least one selected visible surface of the three dimensional image;

(b) selecting a plurality of spatial coordinates of interest from said series of views, each spatial coordinate of interest in said plurality of spatial coordinates of interest being selected by selecting a display coordinate in an associated view in said series of views using the user interface means, and by determining the spatial coordinate of interest based on said associated view and the view-specific one-to-one correspondence between said selected display coordinate and said spatial coordinate of interest mapped thereon;

(c) manipulating the coordinate space via the coordinate space modeling means to orient a selected visible surface of the coordinate space, such that the selected visible surface of the coordinate space corresponds to said at least one optimal surface.

2. The method as defined in claim 1 wherein step (c) is executed automatically on user command after selection of at least two coordinates of interest.

3. The method as defined in claim 2 wherein step (c) is executed automatically on user command after selection of at least three coordinates of interest.

4. The method as defined in claim 3 wherein step (c) comprises calculating a first vector by subtracting a first coordinate of interest of said at least three coordinates of interest from a second coordinate of interest of said at least three coordinates of interest;

calculating a second vector by subtracting said first coordinate of interest from a third coordinate of interest of said at least three coordinates of interest;

automatically applying the group of commands to
(i) rotate the coordinate space;
(ii) translate a selected visible surface of the coordinate space; and,
(iii) pivot a selected visible surface about an arbitrary spatial coordinate on the selected visible surface;

such that an optimal plane defined by said first vector, said second vector and any one of said at least three coordinates of interest is a visible surface.

5. A method of selecting at least one optimal view from a plurality of views of a three dimensional image generated from an image-defining array using a data processor having a coordinate space modeling means for modeling and manipulating a coordinate space and a display for showing the plurality of views of the coordinate space, the image-defining array having a plurality of ordered image properties, each ordered image property in the plurality of ordered image properties having a unique associated coordinate in the coordinate space such that the three dimensional image is generated in the coordinate space by mapping each ordered image property in the plurality of ordered image properties onto the unique associated coordinate in the coordinate space, each view in the plurality of views having an associated view-defining subarray in the image-defining array, such that each view in the plurality of views is shown on the display by being generated in the coordinate space by mapping each ordered image property in the associated view-defining subarray into the associated coordinate in the coordinate space and being projected from the coordinated space onto the display, the method comprising (a) selecting a plurality of coordinates of interest in the coordinate space;
(b) determining the at least one optimal view in order to contain the plurality of coordinates in a minimum number of view;
(c) showing the at least one optimal view on the display.

6. A system for selecting at least one optimal surface of a three dimensional image generated in a coordinate space by an image-defining array having a plurality of ordered image properties, each ordered image property in the image-defining array having a unique associated spatial coordinate in the coordinate space such that each ordered image property is mappable to the unique associated spatial coordinate, having a plurality of surfaces, each surface of the plurality of surfaces having an associated image-defining subarray in the image-defining array such that each surface of the plurality of surfaces is generated by mapping each ordered image property of the associated image-defining subarray onto the unique associated spatial coordinate, and having a selected visible surface shown in a display, the selected visible surface being one of the plurality of surfaces of the three dimensional image;

the display
having a plurality of display coordinates,
selectably displaying views such that a series of distinct selected visible surfaces of the plurality of surfaces of the three dimensional image are viewable thereon, and
having an associated one-to-one projection means for projecting each selected visible surface of the three dimensional image onto the display, such that a view-specific one-to-one correspondence exists between each display coordinate and the spatial coordinate projected thereon;

the three dimensional image being generated using a data processor having a memory, the memory having access to the image-defining array;

a coordinate space modeling means loaded in memory for modeling and manipulating the coordinate space, the coordinate space modeling means being responsive to a group of commands to
(1) rotate the coordinate space,
(2) translate a selected visible surface of the coordinate space; and,
(3) pivot a selected visible surface about an arbitrary axis on the selected visible surface;

a user interface means for selecting commands from the group of commands, the user interface means communicating with the coordinate space modeling means to relay selected commands to the coordinate space modeling means; and mapping means operable of reach visible surface of the three dimensional image to map each ordered image property of the associated image-defining subarray for each visible surface onto the unique associated spatial coordinate in the coordinate space to generate the visible surface of the three dimensional image;

such that the at least one optimal surface includes at least two spatial coordinates of interest;

the system comprising (a) coordinate selection means operable to select a plurality of spatial coordinates of interest from a series of views generated using user interface means and the coordinate space modeling means, each view inclduing at least one selected visible surface of the three dimensional image, each spatial coordinate of interest in said plurality of spatial coordinates of interest being selected by selecting a display coordinate in an associated view in said series of views using the user interface means, and by determining the spatial coordinate of interest based on said associated view and the view-specific one-to-one correspondence between said selected display coordinate and said spatial coordinate of interest mapped thereon;

(b) optimal surface generation means operable to manipulate the coordinate space via the coordinate space modeling means to orient a selected visible surface of the coordinate space, such that the selected visible surface of the coordinate space corresponds to said at least one optimal surface.

7. The system as defined in claim 6 wherein said optimal surface generation means operates automatically on user command after selection of at least two coordinates of interest.

8. The system as claimed in claim 7 wherein said pivot control means is operable by the user via the user interface means to rotate a selected visible surface of the coordinate space about an arbitrary axis intersecting at least tow arbitrarily selected points, said at least two arbitrarily selected points being separately selectable.

9. The method as defined in claim 6 wherein said optimal surface generation means operates automatically on user command after selection of at least three coordinates of interest.

10. The method as definded in claim 9 wherein said optimal surface generation means calculates a first vector by subtracting a first coordinate of interest of said at least three coordinates of interest from a second coordinate of interest of said at least three coordinates of interest, calculates a second vector by subtracting said first coordinate of interest from a third coordinate of interest of said at least three coordinates of interest; and, automatically applies the group of commands to (i) rotate the coordinate space;
(ii) translate a selected visible surface of the coordinate space; and
(iii) pivot a selected visible surface about an arbitrary axis on the selected visible surface, such that an optimal plane defined by said first vector, said second vector and any one of said at least three coordinates of interest is a visible surface.

11. The system as claimed in claim 6 wherein said optimal surface generation means comprises pivot control means operable by the user via the user interface means to pivot a selected visible surface of the coordinate space about an arbitrary axis intersecting an arbitrary selected point.

12. A system for viewing at least one coordinate of interest in a three dimensional image generated on a data processor having a coordinate space modeling means for modeling and manipulating a coordinate space and a display for simultaneously showing at least three views of the three dimensional image, the system comprising point selection means for selecting an arbitrary coordinate of interest from a first view in the plurality of views;

orthogonal view generation means for generating two mutually orthogonal views on the display, both of said two mutually orthogonal views on the display being orthogonal to said first view and intersecting with said first view at said arbitrary coordinate of interest such that said arbitrary coordinate of interest can be viewed from three orthogonal directions simultaneously.

13. The system as defined in claim 12 further comprising rotation means operable by the user to rotate two orthogonal views about a normal to a third orthogonal view passing through said arbitrary coordinate of interest.

* * * * *